United States Patent
Stanfield

[11] 3,901,328
[45] Aug. 26, 1975

[54] IMPLEMENT MOUNTING ARRANGEMENT FOR EARTHMOVING EQUIPMENT

[75] Inventor: Glenn H. Stanfield, Joliet, Ill.

[73] Assignee: Caterpillar Tractor Company, Peoria, Ill.

[22] Filed: Oct. 7, 1974

[21] Appl. No.: 512,197

[52] U.S. Cl. ............................ 172/699; 172/250
[51] Int. Cl.² ..................................... B62D 21/12
[58] Field of Search .......... 172/245, 250, 253, 699, 172/801, 808; 280/415 R

[56] References Cited
UNITED STATES PATENTS

| | | | |
|---|---|---|---|
| 2,998,965 | 9/1961 | Larson | 172/699 X |
| 3,503,456 | 3/1970 | Larson | 172/699 X |
| 3,675,349 | 7/1972 | Luck | 172/250 X |
| 3,809,167 | 5/1974 | Glider | 172/808 |
| 3,844,369 | 10/1974 | Schroeder | 172/801 X |

Primary Examiner—Leo Friaglia
Attorney, Agent, or Firm—Phillips, Moore, Weissenberger Lempio & Strabala

[57] ABSTRACT

The invention provides mounting means for mounting a ripper attachment on an earthworking vehicle which means function to permit interchangeability of the ripper attachment with other, rear-mounted, attachments and to permit ready access to rear-mounted vehicle components. The mounting means include a pair of laterally spaced mounting brackets, each of which includes a pair of laterally spaced bracket plates straddle mountable on ears provided on the vehicle frame. The ripper attachment is pinned to the mounting brackets, which brackets are pivotally displaceable from an operating position to a position where rear-mounted vehicle components are accessible. The mounting brackets are displaceable under power through the action of the ripper assembly hydraulic mechanism.

13 Claims, 5 Drawing Figures

IMPLEMENT MOUNTING ARRANGEMENT FOR EARTHMOVING EQUIPMENT

CROSS-REFERENCE TO RELATED APPLICATIONS

This invention relates to the inventions disclosed in U.S. patent applications Ser. No. 152,196, filed on Oct. 7, 1974, by Frederick Kokaly and Leon Wirt, entitled PUSH BLOCK AND DRAWBAR ASSEMBLY FOR TRACTORS, and Ser. No. 512,194, filed on Oct. 7, 1974, by Albert Gianessi and Leon Wirt, entitled PINNED ON MODULAR ATTACHMENTS WITH INTERCHANGEABLE COMPONENTS, both applications being of common assignment herewith.

BACKGROUND OF THE INVENTION

This invention relates to mounting means for mounting attachments on earthworking vehicles. In particular, this invention relates to a method and means for mounting a ripper attachment on an earthworking vehicle to permit the facile interchangeability of the ripper assembly with other vehicle attachments. The mounting means further functions as a guard for rear-mounted vehicle components and includes means for providing ready access to such vehicle components.

The massive size and weight of modern earthworking vehicles dictate considerable design effort to assure optimum location of various vehicle component parts and assemblies. If such efforts are not fruitful, excessive forces transmitted between, for example, a tractor and its associated implement create high stresses in tractor components which tend to cause premature failure of these components and of the associated mounting structure for such implement.

The usual approach to this problem is to increase the size of such components. However, this adds significantly to the total weight of the vehicle and renders more difficult the interchanging of vehicle attachments and their associated mounting structures.

Further, to facilitate manufacture and servicing of earthworking vehicles, modular component parts such as the rear-mounted transmission for crawler tractors described in U.S. Pat. No. 2,971,398, of common assignment herewith, are now employed. Such modular components, however, present additional problems in that means must be provided to permit access to such components for servicing. Preferably, means are also provided for protecting such modular components from inadvertent damage during operation of the vehicle.

The usual practice in the industry is to bolt relatively large mounting brackets to the rear of earthworking vehicles upon which the required attachment is mounted. In large machines, attachments such as ripper assemblies are necessarily heavy and bulky and typically require crane or hoist facilities for removal of the ripper assemblies so that access to rear-mounted modular vehicle components may be had. Additionally, the removal of such large mounting brackets usually entails tedious and time-consuming removal of the associated securing bolts. As a result, the substitution of attachments which require different mounting brackets or the necessity of even minor servicing of the rear-mounted vehicle components can result in excessive down time due to the operations required to remove and reinstall the attachments.

It is, therefore, desirable to provide mounting means for mounting a ripper attachment on an earthworking vehicle which facilitate interchangeability of the ripper with other attachments such as a drawbar or pushblock and which further facilitate access to rear-mounted vehicle components. It is also desirable that such mounting means function to alleviate customary stresses between the vehicle and the mounted attachment, provide protection for rearmounted vehicle components, and afford a secure and convenient mounting structure which does not appreciably increase the total weight of the vehicle.

SUMMARY AND OBJECTS OF THE INVENTION

The present invention provides a method and means for mounting a ripper attachment on an earthworking vehicle so that the ripper is readily interchangeable with other attachments and so that ready access to rear-mounted vehicle components is obtainable. The mounting means further function to protect rear-mounted vehicle components from impact damage and to transfer attachment loads directly and evenly to the main frame of the vehicle.

The mounting means of the invention includes a pair of laterally spaced parallel mounting brackets such as those described in the above-mentioned copending U.S. application Ser. No. 512,194, filed by Gianessi, et al, in combination with a cross-beam member disposed between the brackets to maintain lateral spacing between the brackets and provide a rigid mounting structure for the ripper attachment which absorbs side-loading. The mounting brackets each comprise a pair of parallel laterally spaced bracket plates which are straddle-mounted upon the vehicle frame to evenly and directly transfer attachment loads thereto and which include a plurality of aperture means for receiving pins which removably secure the mounting brackets to the vehicle and which permit the pivotal displacement of the mounting brackets from their operating position to a position permitting access to the rearmounted vehicle components. Pivotal displacement of the mounting brackets is controlled by powered operation of the hydraulic mechanism associated with the ripper attachment. The mounting means further include means for protecting rear-mounted vehicle components such as a rear-mounted transmission.

The mounting means of the invention thus permit ready access to rear-mounted vehicle components and permit ready interchangeability of the ripper attachment with, for example, the hitch attachment described in the above-mentioned U.S. patent application Ser. No. 512,194, filed by Gianessi, et al, or the drawbar pushblock attachment described in the above-mentioned U.S. patent application Ser. No. 512,196, filed by Kokaly, et al, by substituting the particularly designed mounting brackets embodied in this invention for those described in the above-noted copending applications.

It is an object of this invention to provide mounting means for mounting a ripper attachment on an earthworking vehicle which permit the ready powered removal and interchangeability of the ripper attachment with other rear-mounted vehicle attachments.

It is another object of this invention to provide mounting means for mounting a ripper attachment on an earthworking vehicle which permit ready access to rear-mounted vehicle components.

It is a further object of this invention to provide mounting means for mounting a ripper attachment on an earthworking vehicle which are displaceable by the hydraulic mechanism of the ripper attachment to permit ready access to rear-mounted vehicle components.

It is a further object of this invention to provide ripper attachment mounting means which function to protect rear-mounted vehicle components.

It is yet another object of this invention to provide mounting means for mounting a ripper attachment on an earthworking vehicle which directly and evenly transfer attachment loads to the vehicle frame.

It is an additional object of this invention to provide mounting means for mounting a ripper attachment on an earthworking vehicle which function to provide a readily demountable, relatively lightweight, rigid mounting structure which is capable of absorbing side-loading.

Other objects and advantages of the invention will become apparent from the following description and drawings.

DETAILED DESCRIPTION

Figure 1:
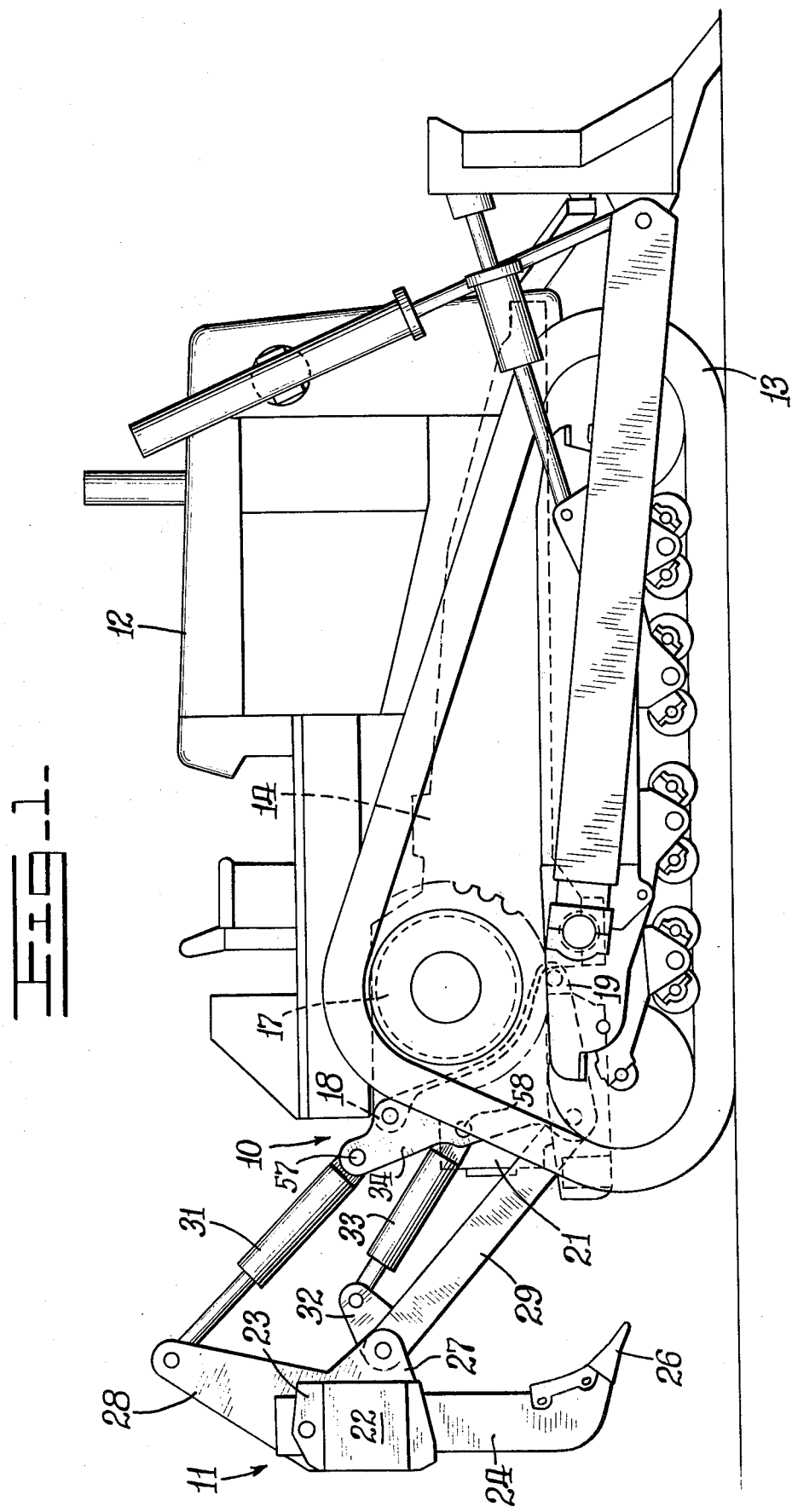
FIG. 1 is an elevation of an earthworking vehicle in association with a ripper attachment in carry position, and the mounting means of this invention.

With particular reference to FIGS. 1–4, the mounting means of the present invention are shown generally indicated at 10 in association with a ripper attachment generally indicated at 11, and a crawler tractor 12. The tractor 12 may be of the type described in U.S. application Ser. No. 283,968, filed Aug. 28, 1972 and now U.S. Pat. No. 3,828,873, of common assignment herewith, and may include a pair of laterally spaced track assemblies, one of which is shown at 13, individually disposed on opposite sides of the tractor 12.

The tractor 12 includes an elongated main frame 14 of the type described in U.S. application Ser. No. 338,314, filed Mar. 5, 1973, of common assignment herewith. The frame 14 includes a transversely extending final drive housing 17 disposed adjacent the rear end of the frame and housing cross-drive means (not shown) for driving the assemblies 13. The frame 14 further includes a pair of laterally spaced rearwardly extending upper mounting ears 18 and a pair of laterally spaced, rearwardly extending lower mounting ears 19.

A transmission 21 is mounted in rearwardly disposed relation to the final drive housing 17 and projects rearwardly therefrom beyond the upper mounting ears 18 so that the transmission is accessible for servicing or removal.

The ripper attachment 11 generally includes a transversely extending ripper beam 22 having a plurality of sockets 23 therein for receiving a corresponding number of ripper shanks 24 which are adapted for ground-engagement to break up material for removal. The shanks 24 desirably each include a replaceable wear point 26. The ripper beam 22 further includes a forwardly extending ripper bracket 27 and an upwardly extending ripper bracket 28 which respectively pivotally receive the rearward end of a lower link 29 and an upper motor link 31. The lower link 29 includes a jack bracket 32 which pivotally supports the rearward end of a ripper lift jack 33 disposed in generally forwardly extending relation therefrom. The upper link 31 is advantageously of the extensible-retractible type such as described in U.S. Pat. No. 3,503,456, of common assignment herewith, comprising a hydraulic motor jack which permits rotation of the ripper beam 22 about its pivotal connection to the lower link 29 for adjusting the angle of the shank 24 with respect to the ground.

Figure 3:
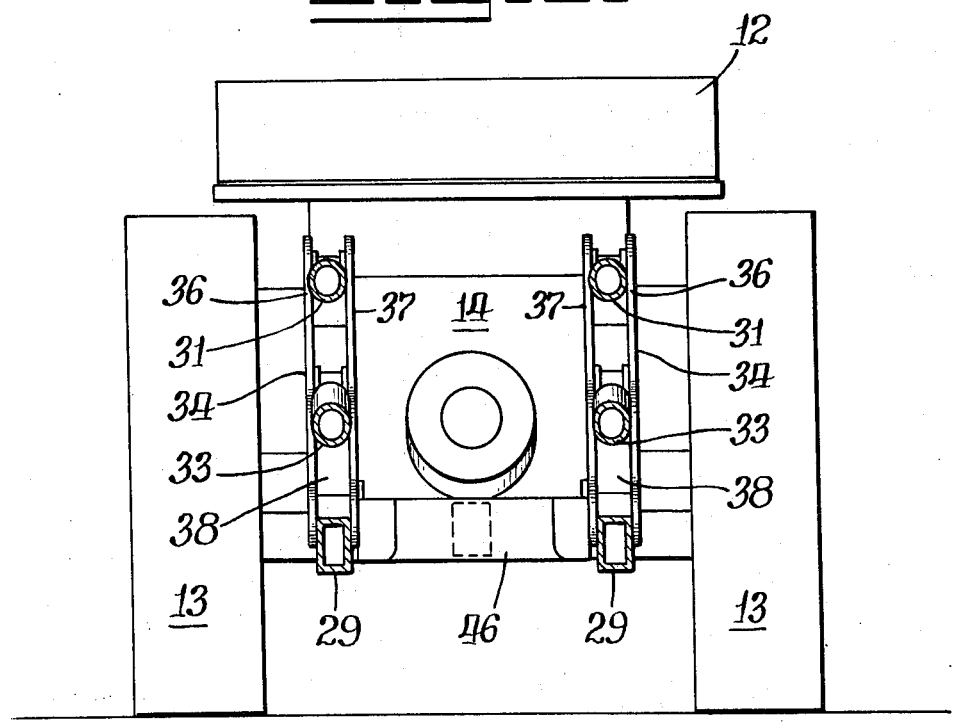
FIG. 3 is a rear sectional view of the vehicle and mounting means of FIG. 2 taken along the line III–III of FIG. 2.
Figure 5:
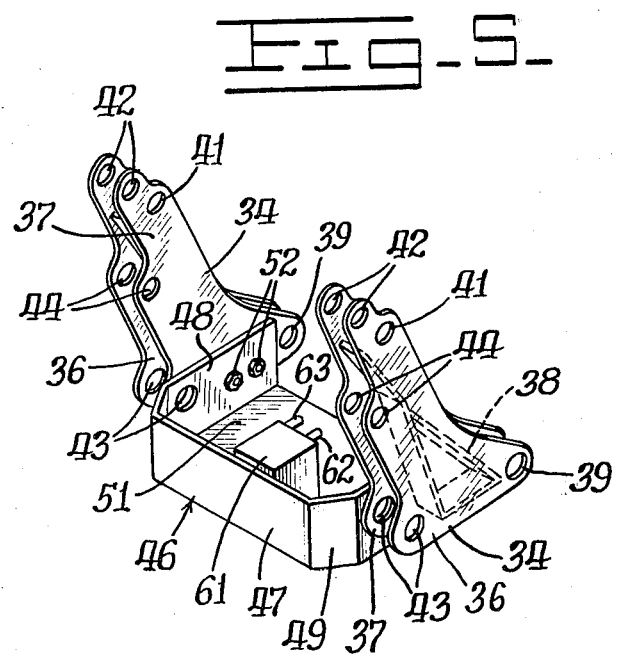
FIG. 5 is a perspective view of the mounting means of this invention.

As best shown in FIGS. 3 and 5, the mounting means 10 is similar to that described in application Ser. No. 512,194 and comprises a pair of laterally spaced mounting brackets 34, each of which includes a pair of laterally spaced bracket plates 36 and 37, secured together by a reinforcing member 38. The brackets 34 include first and second pin-receiving means comprising lower aligned mounting apertures 39 and upper aligned mounting apertures 41 for receiving pins which removably secure the brackets 34 to the lower mounting ears 19 and the upper mounting ears 18 on the frame 14. Third, fourth and fifth pin-receiving means are provided comprising upper aligned connecting apertures 42, lower aligned connecting apertures 43, and central aligned connecting apertures 44 for receiving pins which removably secure the ripper attachment 11 to the mounting means 10.

The spaced brackets 34 are interconnected by a lower cross-beam member and guard 46 which is a three-sided generally pan-shaped member. The cross beam 46 includes a front wall 47 and a pair of extending sidewalls 48 integrally connected to the front wall 47 by a pair of angled connecting portions 49. The front and side walls are integrally formed with and connected respectively to the front and side edges of a lower bottom portion 51. The sidewalls 48 include a plurality of mounting holes adapted to receive a plurality of bolts 52 which are disposed in removable securing relation to the inner plates 37 of the brackets 34. This interconnection of the brackets 34 provides a rigid mounting structure for absorbing side loads as well as establishing and maintaining the lateral spacing between the brackets 34.

OPERATION

The mounting assembly 10 is secured to the tractor main frame 14 with the brackets 34 individually disposed in straddling relation to a respective set of the upper and lower mounting ears 18 and 19. A plurality of upper mounting pins 53 are disposed in retaining relation through the upper mounting apertures 41 and the mounting ears 18 to removably secure the upper portion of the mounting means 10 to the main frame 14. A pair of retaining pins 54 are disposed in retaining relation through the lower mounting apertures 39 and the lower mounting ears 19.

The mounting means 10 may be removably secured to the main frame 14 in relatively rigid load-transferring relation thereto for supporting the ripper attachment 11 relative to the tractor 12. This is accomplished by pivotally connecting the forward end of the lower link 29 to the mounting bracket 34 by inserting a pair of pins 56 through the lower connecting apertures 43 in each of the brackets and through a suitably aligned opening in the forward end of the lower link 29. The upper links 31 are pivotally connected to the mounting brackets 34 by inserting a pair of pins 57 through the upper connecting apertures 42 and a suitably aligned opening in the forward end of the upper link. The lift jack 33 is similarly connected to the brackets 34 by inserting a pin 58 through the central aligned connecting apertures 44 and a suitably aligned opening in the forward end of the lift jack 33.

In operation, the ripper 11 may be manipulated between a raised-carry position as illustrated in FIG. 1 and a lower operative position wherein the tip 26 engages the ground for breaking up the material to be worked. This is accomplished by actuating the jack 33 which is disposed between the generally parallel linkage formed by the lower and upper links 29 and 31, the mounting brackets 34 and the ripper beam 22 so that extension of the jack 33 lowers the ripper 11 and retraction thereof raises the ripper to the carry position shown in FIG. 1.

Figure 2:
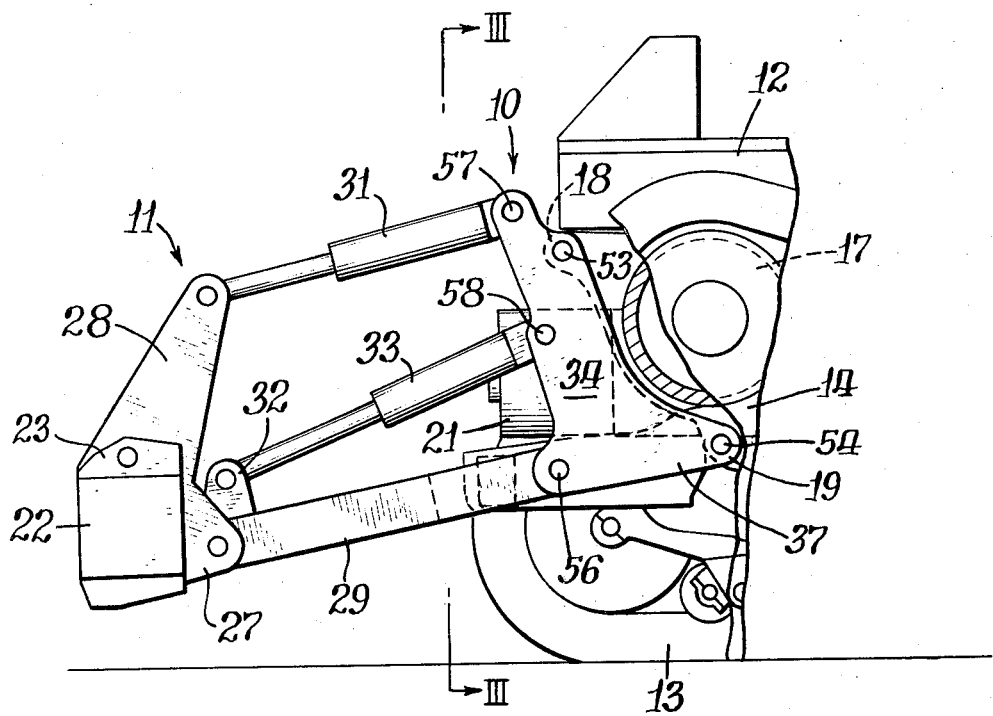
FIG. 2 is a partial cutaway view of the vehicle of FIG. 1 illustrating in detail the mounting means and ripper attachment in its lowered position.
Figure 4:
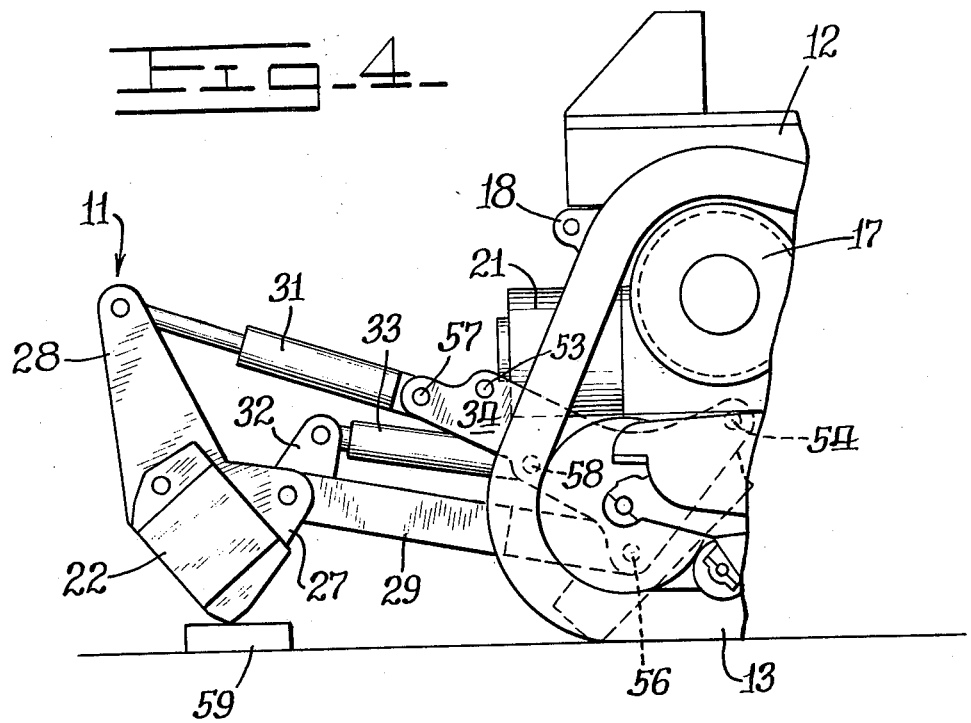
FIG. 4 is a view similar to FIG. 2 illustrating the ripper attachment braced against the ground and the mounting means pivotally displaced from the operating position shown in FIG. 2.

Access to the transmission 21 or other rear mounted components may be readily provided with the improved mounting means 10 as follows. The operator of the tractor 12 first removes the shanks 24 in order to permit the ripper beam 22 to be lowered adjacent to the ground as illustrated in FIG. 2. A block such as that illustrated at 59 in FIG. 4 is then placed under the beam 22 to support the ripper attachment 11 during the servicing operation. Manipulation of the jack 33 relieves the load on the upper mounting pins 53 and allows removal of those pins from the associated mounting apertures 41 of the brackets 34 and the aligned holes in the upper mounting ears 18 of the main frame 14. The lift jack 33 is then again manipulated in a contracting direction as would normally be done for raising the ripper mechanism 11. Since the pins 53 have been removed, the contracting action of the jack 33 will rotate the mounting brackets 34 about their lower pivotal connections 54 to the lower mounting ears 19. This action results in the ripper mounting means 10 being rotated downwardly to the position illustrated in FIG. 4 wherein the cross member and guard 46 engage the work surface.

As shown in FIG. 4, this disposes the mounting means 10 in a position which permits convenient access to the transmission 21 or other rear-mounted components. Once servicing of the transmission 21 or other rear-mounted component is completed, the lift jack 33 is actuated to an extended position to lift the mounting brackets 34 back into the installed position illustrated in FIGS. 1 and 2 to permit the reinstallation of the pins 53. Once this is accomplished the ripper 11 is again secured to the main frame, and the shanks 24 may be reinstalled to place the ripper again in operative condition. If desired, somewhat limited access to the transmission is possible by unbolting and unpinning pan-shaped member 46 from brackets 34.

As shown in FIGS. 1–3, with the mounting brackets 34 secured in supporting relation to the main frame 14, the cross beam 46 is disposed in underlying protective relation to the transmission 21 which substantially prevents rocks or other large objects unearthed by the forward movement of the ripper shank 24 during the ripping operation from contacting and damaging the transmission 21. The lower wall 51 of the cross-beam member 46 also provides a convenient mounting surface for ripper control valves 61. The pan-like shape affords protection by the front wall 47 and the sidewalls 48. This permits the ripper control valves 61 to be mounted adjacent to the lift jacks 33 and the extendible-retractible upper links 31 so as to minimize the length of the intercommunicating hydraulic lines. In this way, only a main supply line 62 and a return line 63 are required to extend between the control valves 61 and the body of the tractor 12. This convenient location of the control valves minimizes fluid communication problems and reduces the risk of damage to the hydraulic lines as well as reducing hydraulic flow losses between the control valves 61 and the ripper-actuating cylinders.

It is apparent that the present invention provides ripper-mounting means which permit ready interchangeability of the ripper attachment with other rear-mounted attachments, and which further facilitate access to rear-mounted vehicle components. The mounting means of the invention further provide a strong mounting structure without adding appreciably to total vehicle weight and further alleviate stresses customarily developed in the vehicle and its mounted attachment.

Although the invention has been described with respect to specific embodiments, it is apparent that modifications and variations are possible within the spirit of the inventive concepts. No limitations are intended except by the scope of the appended claims.

I claim:

1. In an earthmoving vehicle having frame means, mounting means for mounting a ripper attachment to said frame means, said mounting means including a pair of laterally spaced-apart bracket means removably mounted upon said frame means by pin means, said pair of bracket means having a plurality of pin-receiving aperture means for receiving other pin means for placement of said pin receiving aperture means in aligned disposition with aperture means of said ripper attachment for receiving said other pin means to connect said ripper attachment to said pair of bracket means, a ripper attachment, said ripper attachment pinned to said bracket means at said pin receiving aperture means and selectively pivotable as a unit with said mounting means for pivoting about some pins of said first stated pin means toward and away from a portion of said earthmoving vehicle upon removal of all but said some pins of said first stated pin means to provide access to said portion without complete removal of said ripper attachment from said earthmoving vehicle.

2. The invention of claim 1 wherein each of said pair of laterally spaced-apart bracket means include a pair of upstanding plate members spaced apart from one another by structural means.

3. The invention of claim 2 wherein each said pair of upstanding plate members has aligned first aperture means and aligned second aperture means spaced apart from said first aperture means, said vehicle frame means including first ear portions having third aperture means alignable with said first aperture means of said plate members for receiving first pin means concurrently therethrough to pin-connect said upstanding plate members to said first ear portions.

4. The invention of claim 3 wherein said vehicle frame means further includes second ear portions having fourth aperture means alignable with said second aperture means of said plate members for receiving second pin means concurrently therethrough to pin-connect said upstanding plate members to said second ear portions.

5. The invention of claim 4 wherein said upstanding plate members are substantially triangularly shaped with said first and second aperture means being disposed at respective first and second apexes thereof.

6. The invention of claim 4 wherein said upstanding plate members include further aperture means for co-acting with further aperture means in said ripper attachment to selectively pin-connect said ripper attachment to said spaced-apart bracket means.

7. The invention of claim 6 wherein said mounting means further include cross beam means laterally disposed between said pair of laterally spaced-apart bracket means and being fixedly connected concurrently by both of said pair of bracket means for structural support thereof.

8. The invention of claim 7 wherein said cross beam means include bottom plate means extending laterally across from one said bracket means to the other said bracket means for protecting the underportion of said vehicle from impact damage.

9. The invention of claim 8 wherein said cross beam means are removably bolted to said pairs of upstanding plate members.

10. The invention of claim 8 wherein said ripper attachment includes ripper shank holding means for removably supporting a ripper shank, said ripper shank being adapted to connect to a ripper tip member.

11. The invention of claim 10 wherein said ripper attachment further includes a plurality of hydraulic jack means connected between said shank-holding means and said pair of bracket means for selectively changing the orientation of said shank-holding means with respect to said bracket means and with respect to said vehicle.

12. The invention of claim 11 wherein said ripper attachment further includes a pair of longitudinally extending support beam means pivotally connected to said shank-holding means and straddlingly connected between said upstanding plate members of said bracket means.

13. A method of mounting a hydraulically actuated ripper attachment to an earthmoving vehicle having frame means and having attachment mounting bracket means connected by means of a plurality of pins to said frame means, said method including the sequential steps of:
a. connecting said ripper attachment to said bracket means;
b. pivotally connecting a first portion of said bracket means to said frame means by means of first pivot pins;
c. hydraulically actuating said ripper attachment to cause rotation of said bracket means about said first pivot pins; and
d. connecting a second portion of said bracket means to said frame means by means of second pivot pins.

* * * * *